US011347930B2

(12) United States Patent
Peng

(10) Patent No.: US 11,347,930 B2
(45) Date of Patent: May 31, 2022

(54) METHOD AND APPARATUS FOR AUTOMATICALLY DISPLAYING DIRECTORY OF DOCUMENT

(71) Applicant: Tianjin ByteDance Technology Co., Ltd., Tianjin (CN)

(72) Inventor: Cheng Peng, Beijing (CN)

(73) Assignee: TIANJIN BYTEDANCE TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 17/125,514

(22) Filed: Dec. 17, 2020

(65) Prior Publication Data

US 2021/0150124 A1 May 20, 2021

Related U.S. Application Data

(63) Continuation of application No. PCT/CN2018/113430, filed on Nov. 1, 2018.

(30) Foreign Application Priority Data

Jun. 29, 2018 (CN) .......................... 201810717480.1

(51) Int. Cl.
*G06F 3/04817* (2022.01)
*G06F 40/137* (2020.01)
(Continued)

(52) U.S. Cl.
CPC ........ *G06F 40/137* (2020.01); *G06F 3/04817* (2013.01); *G06F 3/04855* (2013.01);
(Continued)

(58) Field of Classification Search
CPC ...... G06F 40/137; G06F 40/258; G06F 16/93; G06F 16/34; G06F 3/04817; G06F 3/04855
See application file for complete search history.

(56) References Cited

U.S. PATENT DOCUMENTS 5,781,785 A * 7/1998 Rowe .................... G06F 40/123
715/234
6,178,433 B1 * 1/2001 Nakamura .......... G06F 16/9577
715/234
(Continued)

FOREIGN PATENT DOCUMENTS

CN 101102434 A 1/2008
CN 101388041 A 3/2009
(Continued)

OTHER PUBLICATIONS

The First Office Action for Chinese Patent Application No. 201810717480.1 (18 pages).
(Continued)

*Primary Examiner* — Tuyetlien T Tran
(74) *Attorney, Agent, or Firm* — ArentFox Schiff LLP

(57) ABSTRACT

The present disclosure provides a method and an apparatus for automatically displaying a directory of a document. The method includes: obtaining a directory hierarchy of the document, the directory hierarchy including entries of the directory and levels of the entries; and displaying, based on the directory hierarchy, the entries of the directory in a form of thumbnail symbols in a directory display area, the directory display area being an area disposed at a side position in a document display area for displaying the directory. The method and apparatus can generate a directory automatically based on the document structure without manual maintenance, and the directory structure of the document is displayed in a form of thumbnail icons at a side position in the document display area, thereby leading to the simple and clear directory without occupying too much display space.

11 Claims, 9 Drawing Sheets

(51) Int. Cl.
*G06F 3/04855* (2022.01)
*G06F 16/93* (2019.01)
*G06F 16/34* (2019.01)
*G06F 40/258* (2020.01)

(52) U.S. Cl.
CPC .............. *G06F 16/34* (2019.01); *G06F 16/93* (2019.01); *G06F 40/258* (2020.01)

(56) References Cited

U.S. PATENT DOCUMENTS

| | | | | |
|---|---|---|---|---|
| 8,078,603 | B1* | 12/2011 | Chandratillake | G06F 16/74 707/706 |
| 9,223,475 | B1* | 12/2015 | Kim | G06F 3/0488 |
| 2002/0023155 | A1* | 2/2002 | Clarke | H04L 29/12009 709/225 |
| 2002/0184189 | A1* | 12/2002 | Hay | G06Q 50/20 |
| 2003/0033402 | A1* | 2/2003 | Battat | H04L 41/069 709/224 |
| 2003/0122873 | A1* | 7/2003 | Dieberger | G06F 16/338 715/764 |
| 2004/0179044 | A1* | 9/2004 | Carter | G06F 40/109 715/865 |
| 2007/0268300 | A1* | 11/2007 | Jin | G06F 11/327 345/581 |
| 2008/0134060 | A1* | 6/2008 | Albrecht | G06F 16/904 715/762 |
| 2008/0288894 | A1* | 11/2008 | Han | G06F 3/0481 715/855 |
| 2013/0191711 | A1* | 7/2013 | Tashman | G06F 3/0485 715/205 |
| 2013/0262442 | A1* | 10/2013 | Dennis | G06F 16/338 707/722 |
| 2014/0089772 | A1* | 3/2014 | Shetty | G06F 16/958 715/206 |
| 2014/0129921 | A1* | 5/2014 | Bergman | G06F 40/117 715/234 |
| 2014/0325402 | A1* | 10/2014 | Jung | G06F 3/04883 715/763 |
| 2015/0169170 | A1* | 6/2015 | Beach | G06F 3/04812 715/856 |
| 2015/0177933 | A1* | 6/2015 | Cueto | G06F 3/0483 715/776 |
| 2017/0316091 | A1* | 11/2017 | Edge | G06F 40/151 |

FOREIGN PATENT DOCUMENTS

| | | |
|---|---|---|
| CN | 102831267 A | 12/2012 |
| CN | 102855257 A | 1/2013 |
| CN | 103377197 A | 10/2013 |
| CN | 103778141 A | 5/2014 |
| CN | 104584062 A | 4/2015 |
| CN | 105447027 A | 3/2016 |
| CN | 107945248 A | 4/2018 |
| CN | 105095285 A | 3/2019 |
| CN | 106326194 A | 3/2019 |
| EP | 2901404 | 8/2015 |
| WO | 2014052082 A1 | 4/2014 |

OTHER PUBLICATIONS

The Second Office Action for Chinese Patent Application No. 201810717480.1 (18 pages).
Notification to Grant Patent Right for Invention for Chinese Patent Application No. 201810717480.1 (3 pages).
Patent Search Record Information for Chinese Patent Application No. 201810717480.1 (2 pages).
International Search Report for International Patent Application No. PCT/CN2018/113430, dated Apr. 1, 2019 (6 pages).

* cited by examiner

METHOD AND APPARATUS FOR AUTOMATICALLY DISPLAYING DIRECTORY OF DOCUMENT

CROSS-REFERENCE TO RELATED APPLICATION

The present application is a continuation of International Application No. PCT/CN2018/113430, filed on Nov. 1, 2018, which claims a priority to Chinese patent Application No. 201810717480.1, titled "METHOD AND APPARATUS FOR AUTOMATICALLY DISPLAYING DIRECTORY OF DOCUMENT", filed on Jun. 29, 2018, the entire disclosure of which are hereby incorporated herein by reference.

TECHNICAL FIELD

The present disclosure relates to the field of computer application technologies, and more particularly, to a method and apparatus for automatically displaying a directory of a document.

BACKGROUND

When browsing a document containing several pages, the document may be located with the assistance of a directory. The commonly used offline word processing software such as Microsoft Word and Adobe Acrobat has a function of displaying a directory. The directory is added by an author of a document during a process of creating the document, or is manually added by a user when reading the document. Further, in order to display the directory, it is usually needed to expand a display space outside a document display area for complete display of the directory, after multi-level clicking on a toolbar.

In order to provide a lightweight client, the online document processing, especially document processing in an online office system that can be accessed through a browser, is usually limited in functions and does not have the function of displaying a directory. Due to being restricted by a size of a document display area, displaying the directory in a page cannot be achieved as an offline word-format or PDF-format document, in which a window range of the software is expanded to provide an additional display space outside the document display area for displaying a directory. Therefore, with existing online document editing tools, users may only move an active area of the document to a target position by turning pages up and down and dragging a scroll bar or moving a mouse wheel. This brings great inconvenience to operations on the document.

SUMMARY

The present disclosure aims to solve at least one of the technical problems in the related art. A method and an apparatus for automatically displaying a directory of a document are provided.

In order to achieve the above objectives, embodiments of a first aspect of the present disclosure provide a method for automatically displaying a directory of a document. The method includes: obtaining a directory hierarchy of the document, the directory hierarchy including entries of the directory and levels of the entries; and displaying, based on the directory hierarchy, the entries of the directory in a form of thumbnail symbols in a directory display area, the directory display area being an area disposed at a side position in a document display area for displaying the directory.

In some embodiments, said obtaining the directory hierarchy of the document includes: obtaining title information and title level information in the document; and obtaining the directory hierarchy of the document based on the title information and the title level information.

In some embodiments, said displaying, based on the directory hierarchy, the entries of the directory in the form of thumbnail symbols in the directory display area includes: displaying a line segment symbol corresponding to each of the entries of the directory by using the line segment as a thumbnail symbol, wherein the entries of the directory of different levels are displayed in line segments of different lengths.

In some embodiments, said displaying, based on the directory hierarchy, the entries of the directory in the form of thumbnail symbols in the directory display area further includes: obtaining information on an active area in the document, the active area being a currently operated area in a body display area of the document; obtaining a target entry of the directory corresponding to the active area; and displaying prominently a thumbnail symbol representing the target entry of the directory corresponding to the active area.

In some embodiments, said displaying prominently the thumbnail symbol representing the target entry of the directory corresponding to the active area includes: highlighting the thumbnail symbol representing the target entry of the directory corresponding to the active area; and/or changing a display color of the thumbnail symbol representing the target entry of the directory corresponding to the active area.

In some embodiments, said displaying, based on the directory hierarchy, the entries of the directory in the form of thumbnail symbols in the directory display area includes: obtaining position information of a mouse cursor in a display window of the document; and changing, when the mouse cursor is within the directory display area, the entries of the directory from being displayed in the form of thumbnail symbols to being displayed in a form of texts.

In some embodiments, said displaying, based on the directory hierarchy, the entries of the directory in the form of thumbnail symbols in the directory display area includes: monitoring an operation of a mouse within the directory display area; obtaining, when a hovering operation of the mouse is monitored, an entry of the directory corresponding to a hovering position of a mouse cursor, and displaying prominently the entry of the directory corresponding to the hovering position of the mouse cursor; and revoking, when an operation indicating that the mouse cursor has left the hovering position is monitored, the prominently displaying of the entry of the directory corresponding to the hovering position.

In some embodiments, said displaying, based on the directory hierarchy, the entries of the directory in the form of thumbnail symbols in the directory display area includes: monitoring an operation of a mouse within the directory display area; and when a click operation of the mouse is monitored, obtaining an entry of the directory corresponding to a current click position of the mouse; causing content displayed in a body display area of the document to jump to a text position of the entry of the directory corresponding to the current click position of the mouse; and changing a display color for the entry of the directory corresponding to the current click position of the mouse, and/or highlighting the entry of the directory corresponding to the current click position of the mouse.

In some embodiments, said displaying, based on the directory hierarchy, the entries of the directory in the form of thumbnail symbols in the directory display area includes:

displaying a first button icon in the directory display area when a mouse cursor is within the directory display area, wherein the first button icon is configured to switch, upon being clicked by the mouse cursor, a display form of the entries of the directory between performing a constant display and revoking the constant display, and the constant display is a display form in which the entries of the directory are constantly presented as texts.

In some embodiments, said displaying, based on the directory hierarchy, the entries of the directory in the form of thumbnail symbols in the directory display area includes: determining whether a number of the entries of the directory is greater than a predefined number; displaying, in response to the number of the entries of the directory being greater than the predefined number, the predefined number of entries among the entries of the directory, and hiding remaining entries; and providing a directory scroll bar in the directory display area, the directory scroll bar being configured to control a display range of the entries of the directory.

The method for automatically displaying the directory of the document may generate the directory automatically based on the document structure without manual maintenance. Moreover, the directory structure of the document is displayed in a form of thumbnail icons at a side position in the document display area, thereby leading to the simple and clear directory without occupying too much display space. In addition, users may be provided with a variety of directory display solutions by displaying the text of the directory when the mouse cursor is hovering over the directory display area, displaying thumbnail symbols when the mouse cursor has left the directory display area, and showing the constant display when necessary, thereby resulting in the more flexible functions for the directory.

In order to achieve the above objectives, embodiments of a second aspect of the present disclosure provide an apparatus for automatically displaying a directory of a document. The apparatus includes: a directory hierarchy obtaining module configured to obtain a directory hierarchy of the document; and a directory display module configured to, display, based on the directory hierarchy, entries of the directory in a form of thumbnail symbols in a directory display area, the directory display area being an area disposed at a side position in a document display area for displaying the directory.

The apparatus for automatically displaying the directory of the document may generate the directory automatically based on the document structure without manual maintenance. Moreover, the directory structure of the document is displayed in the form of thumbnail icons at a side position in the document display area, thereby leading to the simple and clear directory without occupying too much display space. In addition, users may be provided with a variety of directory display solutions by displaying the text of the directory when the mouse cursor is hovering over the directory display area, displaying thumbnail symbols when the mouse cursor has left the directory display area, and showing the constant display when necessary, thereby resulting in the more flexible functions for the directory.

In order to achieve the above objectives, embodiments of a third aspect of the present disclosure provide a non-transitory computer-readable storage medium having a computer program stored thereon. The computer program, when executed by a processor, causes the method for automatically displaying the directory of the document as described in the first aspect of the present disclosure to be implemented.

The non-transitory computer-readable storage medium according to a fourth aspect of the present disclosure has the same beneficial effects as the method and apparatus for automatically displaying a directory of a document as described in the first and second aspects, respectively, and thus the beneficial effects of the medium will not be repeated here.

In order to achieve the above objectives, embodiments of a fifth aspect of the present disclosure provide an electronic device. The electronic device includes a storage device, a processor, and a computer program stored in the storage device and executable on the processor. The processor, when executing the program, implements the method for automatically displaying the directory of the document according to the above embodiments of the present disclosure.

BRIEF DESCRIPTION OF DRAWINGS

These and other aspects and advantages of embodiments of the present disclosure will become apparent and more readily appreciated from the following descriptions made with reference to the accompanying drawings, in which.

DESCRIPTION OF EMBODIMENTS

Figure 1:
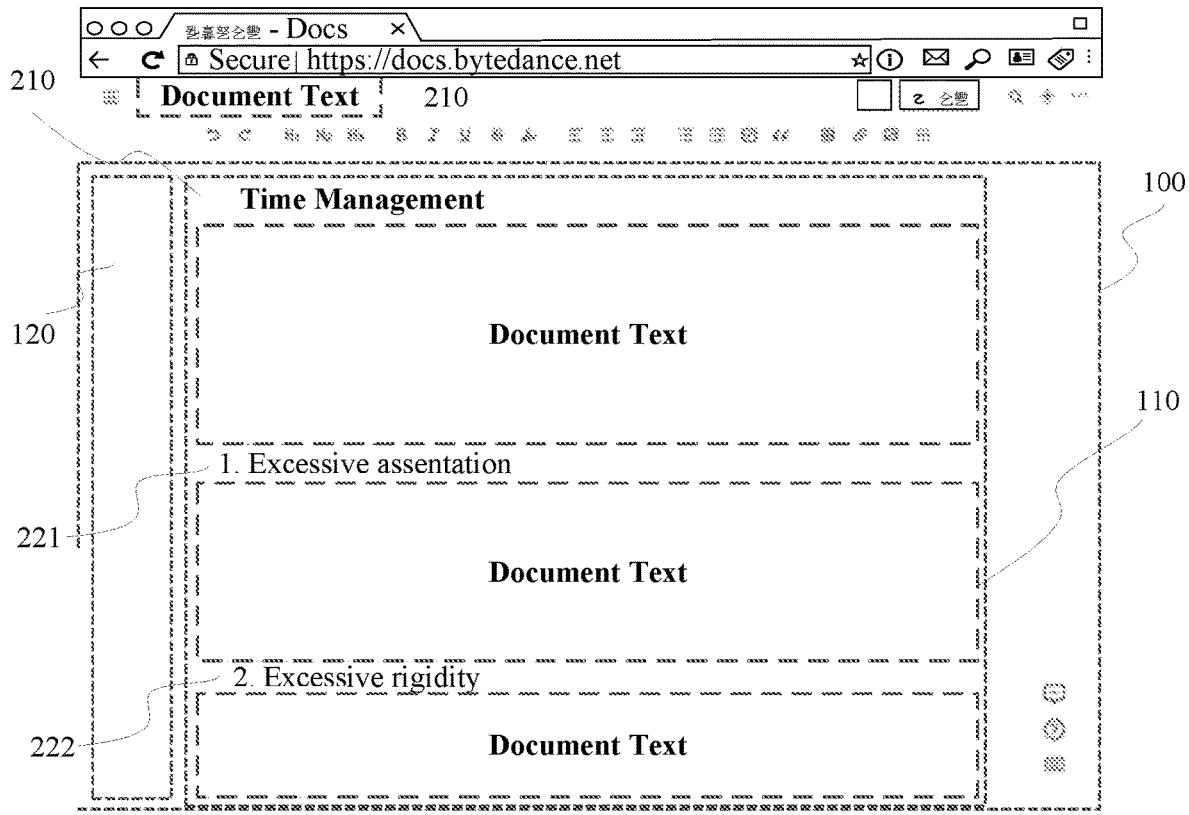
FIG. 1 is a schematic diagram showing a scenario in which a document is displayed according to embodiments of the present disclosure.

Descriptions will now be made in detail to embodiments, examples of which are illustrated in the accompanying drawings. The same or similar elements and the elements having same or similar functions are denoted by like reference numerals throughout the descriptions. The embodiments described herein with reference to the drawings are explanatory, illustrative, and used to generally explain the present disclosure. The embodiments shall not be construed to limit the present disclosure.

In view of problems in the existing online document processing that it is difficult to locate a corresponding position and a display of a directory is not provided and cases where the directory displayed in a form of full texts in the existing directory display occupies a large space, the present disclosure provides a method for displaying the directory in a form of thumbnail images at a side position in a document display area. Therefore, an overall structure of a document may be displayed by occupying a relatively small display space. Also, it should be noted that the method of the present disclosure may also be used for displaying the directory in offline document processing software. This can save the space for displaying the directory provide a relatively large page space for displaying the document, and show the structure more clearly.

The method and apparatus according to embodiments of the present disclosure will be described in detail below with reference to the accompanying drawings. Although the following embodiments are all illustrated by taking online document processing scenarios as examples, the scope of the present disclosure is not limited to this.

FIG. 1 is a schematic diagram showing a scenario in which a document is displayed according to embodiments of the present disclosure. In FIG. 1, a document with a title 210 of "Time Management" is displayed. A document display area 100, an area for displaying elements of a browser, an area for displaying user information, and an area for to displaying a toolbar of the document, etc., are contained in the page. The document display area may change with a position and zooming of a window of the browser. Specifically, a large area in the middle of the document display area is a body display area 110 for displaying a body of the document. Blank areas are saved on left and right sides of the body display area 110, such that the blank areas on the sides of the body display area 110 may be used as a directory display area 120. As illustrated in FIG. 1, the directory display area 120 is set on the left side of the body display area 110 based on browsing habits of most users. The directory display area may also be set on the right side according to different user needs. For example, the users may be provided with options to make settings as needed.

Figure 2:
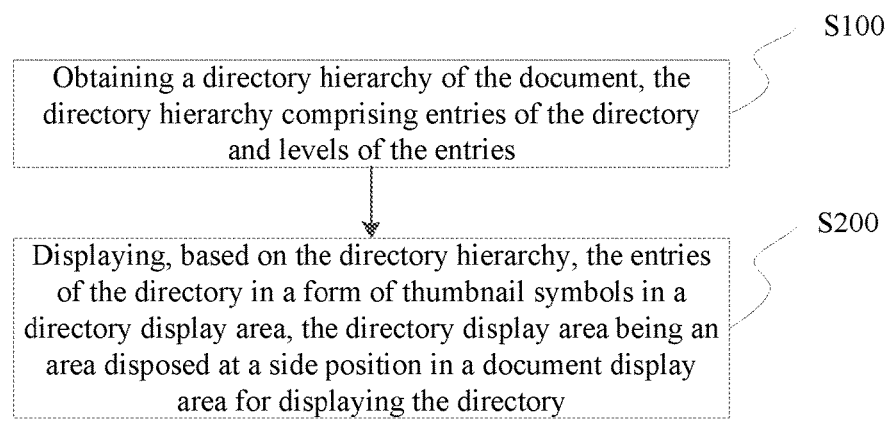
FIG. 2 is a flowchart of a method for automatically displaying a directory of a document according to embodiments of the present disclosure.

FIG. 2 is a flowchart of a method for automatically displaying a directory of a document according to embodiments of the present disclosure. The method may include blocks S100 and S200.

At block S100, a directory hierarchy of the document is obtained. The directory hierarchy includes entries of the directory and levels of the entries.

The directory hierarchy may be obtained from information in the document. For example, in some embodiments, title information and title level information in the document may be obtained. The directory hierarchy of the document may be obtained based on the title information and the title level information. Referring to FIG. 1, the title 210 of the body is Time Management. The body contains second-level titles 221 and 222, etc. The title information may have obvious formatting marks, such as paragraph divisions, line feeds, no indentation, etc., or may be set to different fonts or font sizes, and in many documents, titles at different levels are labeled. For example, the second-level title 221 is "1. Excessive assentation" and the second-level title 222 is "2. Excessive rigidity". With the title information, the directory structure of the document may be quickly established. In the process of online editing of the document, with an increase in the number of titles, the directory structure may be continuously updated and changed accordingly.

Various methods for obtaining information of the document structure in the related art may be applied to the present disclosure, and the present disclosure is not limited thereto.

At block S200, the entries of the directory are displayed in a form of thumbnail symbols in a directory display area based on the directory hierarchy. The directory display area is an area disposed at a side position in a document display area for displaying the directory.

The thumbnail symbols may include symbols of various geometric shapes, such as bars, dots, diamonds, and squares. Generally, symbols of different sizes may be used to represent different directory levels, in order to facilitate distinction.

Figure 3:
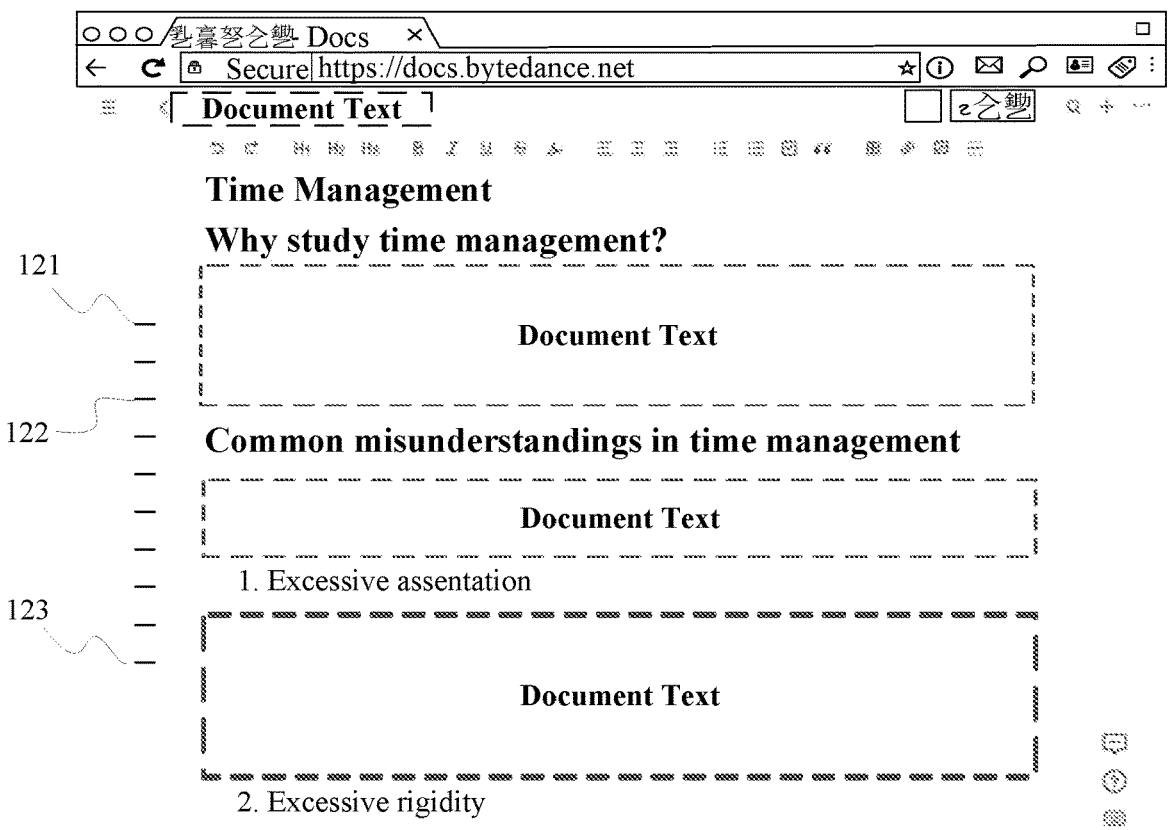
FIG. 3 is a schematic diagram showing a first scenario in which a directory of a document is displayed according to embodiments of the present disclosure.

FIG. 3 is a schematic diagram showing a first scenario in which a directory of a document is displayed according to embodiments of the present disclosure. For sake of reading, in the embodiments of FIG. 3, different directory levels are displayed in different font sizes. For example, first-level titles of "Why study time management" and "Common misunderstandings in time management" and the second-level titles of "1. Excessive assentation" and "2. Excessive rigidity" are displayed in bold fonts with different font sizes.

In various thumbnail symbols, a line segment occupies a small space and may be set flexibly, and thus is especially suitable for representing entries of the directory. Therefore, in some embodiments, displaying the entries of the directory in the form of thumbnail symbols in the directory display area based on the directory hierarchy includes displaying a line segment symbol corresponding to each entry of the directory by using a line segment as a thumbnail symbol. Referring to FIG. 3, for example, line segments 121, 122 and 123 correspond to different entries of the directory. By default, each line segment may be set as a gray horizontal line. The entries of the directory of different levels may be displayed in line segments of different lengths. In addition, it may be set that an entry of a higher level of the directory corresponds to a longer line segment, and entries of a same level of the directory correspond to line segments of the same length. For example, a first-level title is the longest one, a second-level title is the second longest one, and a third-level title is the third longest one.

In the embodiments of FIG. 3, the title of "Time Management" and the first-level titles of "Why study time management" and "Common misunderstandings in time management" are used as the first-level directory based on paragraph divisions and labeling, etc., and are represented by line segments 121 and 122. The line segments 121 and 122 are longer than the line segment 123 serving as the second-level directory.

In addition to representing the document structure, the display of the directory may also identify a current active area. In some embodiments, information of an active area in the document may be obtained. The active area is a currently operated area in a body display area of the document. A target entry of the directory corresponding to the active area is obtained. A thumbnail symbol representing the target entry of the directory corresponding to the active area is displayed prominently. The displaying prominently may include highlighting the thumbnail symbol of the target entry of the directory corresponding to the active area; and/or changing a display color for the thumbnail symbol of the target entry of the directory corresponding to the active area.

For example, if the current active area of the document is the first title, and what represents the entry of the directory of the current active area is a line segment 121, the line segment 121 may be displayed prominently. The grayscale picture in the drawing cannot make a distinctive display. However, in the embodiments, the color of the line segment 121 is actually changed from gray to a more eye-catching color, such as blue.

There are various ways to obtain the information of the active area in the document. For example, a position of a scroll bar of the document may be obtained, and the information of the active area may be determined based on the position of the scroll bar; and/or position information of an input cursor in the document may be obtained, and the information of the active area may be determined based on a position of the input cursor; and/or position information of a mouse cursor of a display window in the document may be obtained, and when the mouse cursor is within the body display area of the document, an area of the document where the mouse cursor is located is determined as the active area.

As a user performs operations on the document, for example, scrolling a mouse wheel or holding down the mouse to drag the scroll bar, etc., the active area of the document will also change correspondingly. At this time, the entry of the directory prominently displayed will also be changed accordingly.

Figure 4:
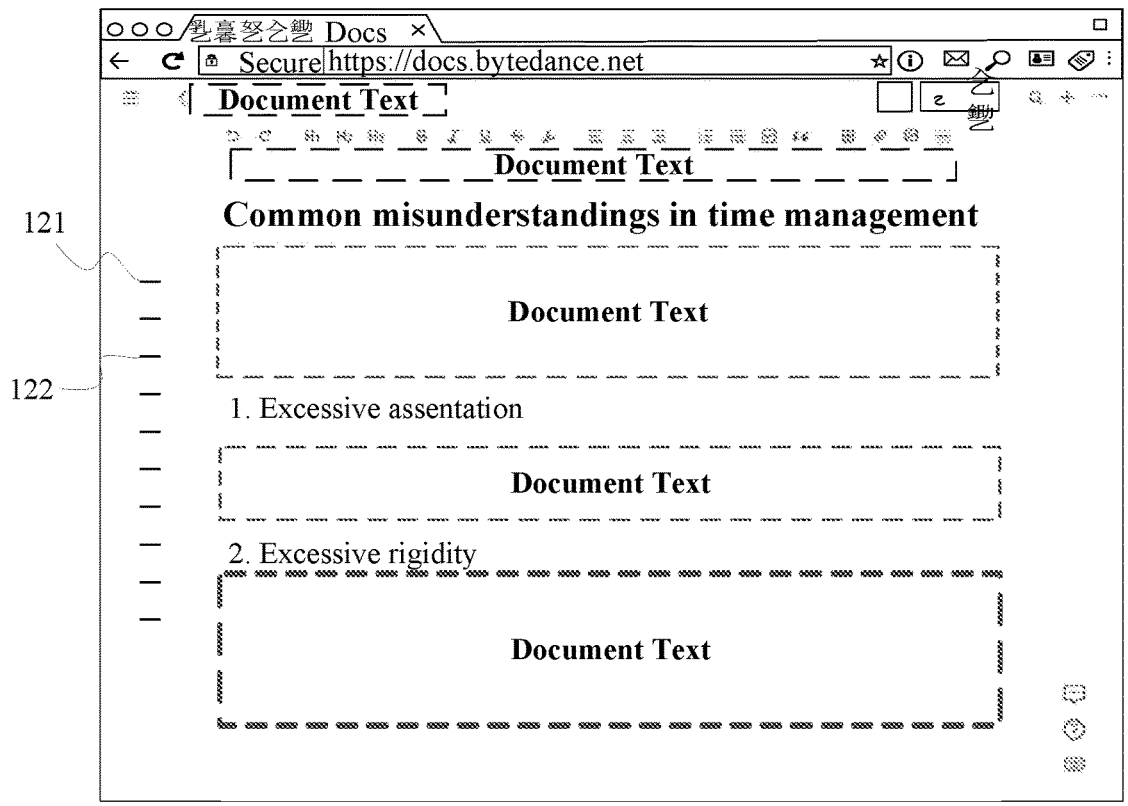
FIG. 4 is a schematic diagram showing a second scenario in which a directory of a document is displayed according to embodiments of the present disclosure.

FIG. 4 is a schematic diagram showing a second scenario in which a directory of a document is displayed according to embodiments of the present disclosure. At this time, compared with FIG. 3, the current active area is changed to the area where the title of "Common misunderstandings in time management" is located, and the thumbnail symbol corresponding to the directory area is the line segment 122. Therefore, the line segment 122 is displayed prominently, while the area corresponding to the line segment 121 is no longer an active area and thus is not highlighted.

Since the form of thumbnail symbols is relatively abstract, when the user needs to understand more detailed information about the directory, the user often needs to refer to the directory in a form of texts. Therefore, in some embodiments, it is set that when the mouse cursor is moved to the directory display area, a directory in the form of texts is displayed.

Figure 5:
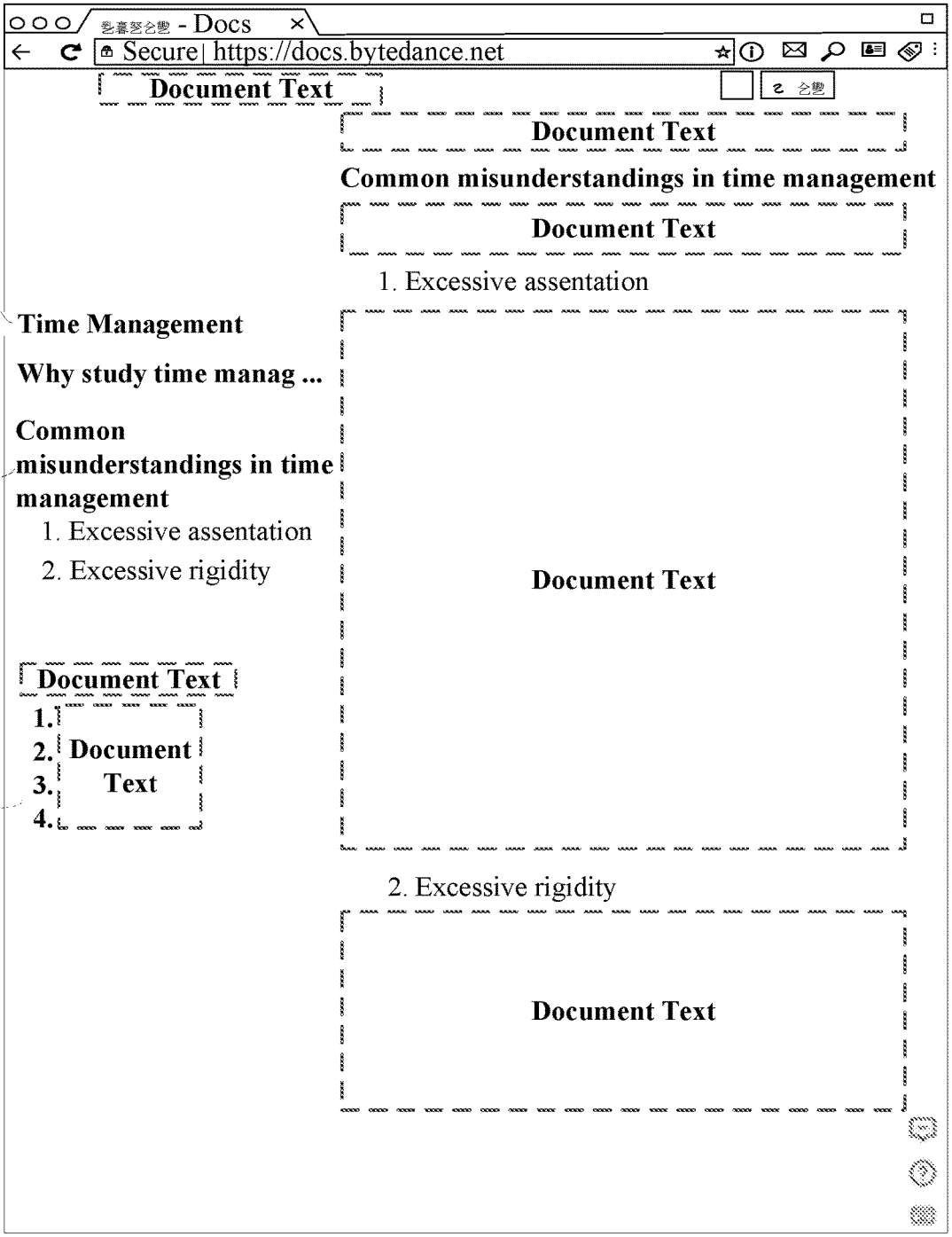
FIG. 5 is a schematic diagram showing a third scenario in which a directory of a document is displayed according to embodiments of the present disclosure.

FIG. 5 is a schematic diagram showing a third scenario in which a directory of a document is displayed according to embodiments of the present disclosure. According to the embodiments, at block S200, displaying the entries of the directory in the form of thumbnail symbols in the directory display area based on the directory hierarchy further includes: obtaining position information of a mouse cursor in a display window of the document; and changing, when the mouse cursor is located within the directory display area, displaying of the entries of the directory in the form of thumbnail symbols to displaying of the entries of the directory in a form of texts. When the mouse cursor has left the directory display area, the entries of the directory are restored to be displayed in the form of thumbnail symbols, for example as illustrated in FIG. 3.

Furthermore, for the directory displayed in the form of texts, an entry of the directory corresponding to an operation of the mouse may be displayed prominently based on the operation, so that the user may find and locate a corresponding area and perform a click operation correspondingly. For example, a mouse operation within the directory display area may be monitored. When a hovering operation of the mouse is monitored, an entry of the directory corresponding to the hovering position of the mouse cursor is obtained, and the entry of the directory corresponding to the hovering position of the mouse cursor is displayed prominently. When an operation indicating that the mouse cursor has left the hovering position is monitored, the prominently displaying of the entry of the directory corresponding to the hovering position may be revoked.

Entries 121', 122' and 123' of the directory in the form of texts in FIG. 5 correspond to the line segments 121, 122 and 123 in FIG. 3. When the mouse hovers over the entry 122' of the directory, the entry "Common misunderstandings in time management" is displayed prominently. For example, in the embodiments, the prominently displaying is performed by changing a displayed color, for example, into dark blue. Due to the limited resolution of grayscale images, a distinction between dark blue and black in the figure may not be clearly observed. The title 122' is displayed in dark blue.

Figure 6:
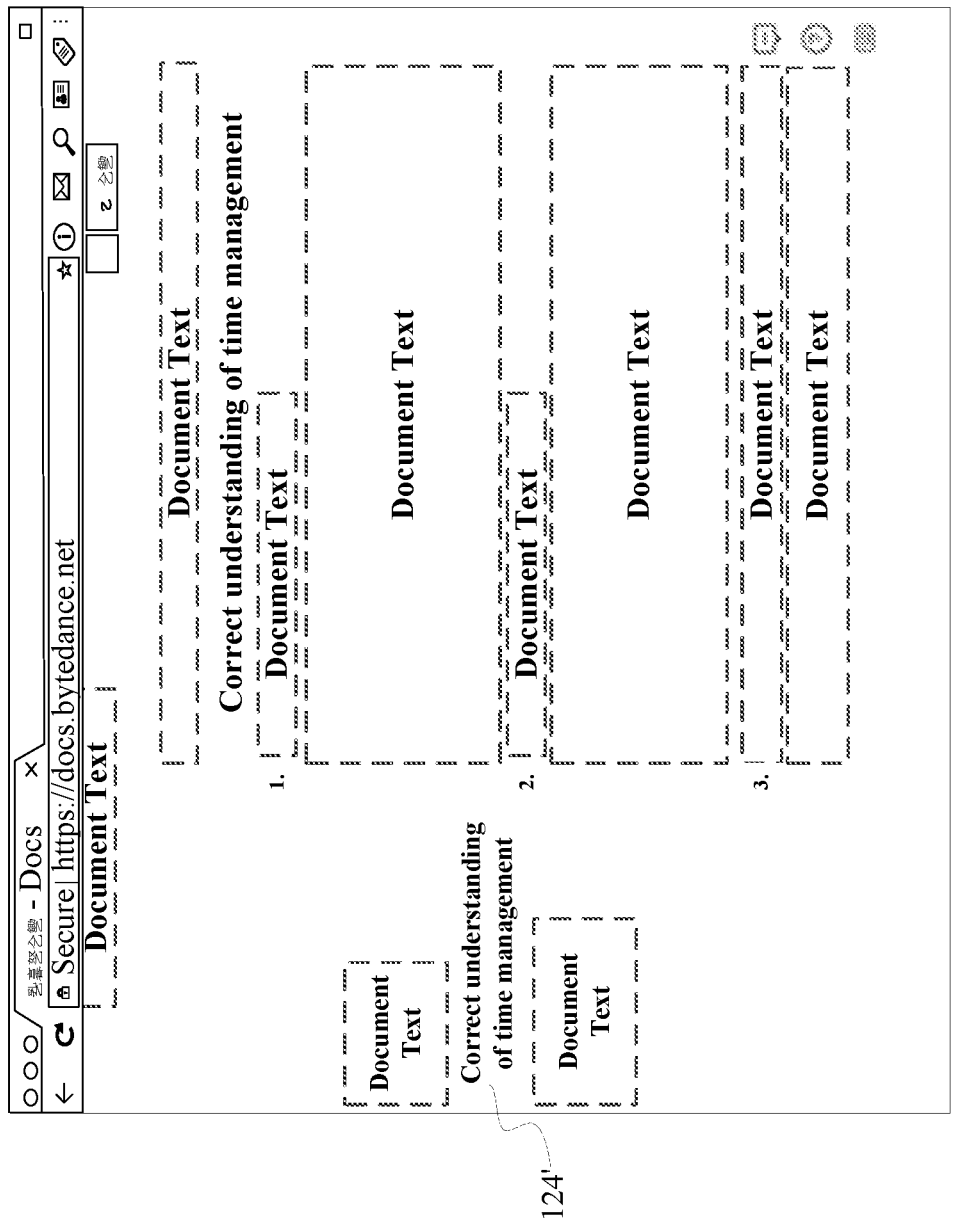
FIG. 6 is a schematic diagram of a fourth scenario in which a directory of a document is displayed according to embodiments of the present disclosure.

In some embodiments, a click operation may be performed on the prominently displayed entry of the directory. When the entry of the directory is clicked, the body display area of the document may jump to corresponding body content. Reference may be made to FIG. 6, which is a schematic diagram of a fourth scenario in which a directory of a document is displayed according to embodiments of the present disclosure.

In the embodiments, displaying the entries of the directory in the form of thumbnail symbols in the directory display area based on the directory hierarchy further includes: monitoring a mouse operation within the directory display area; and when a click operation of a mouse is monitored, obtaining an entry of the directory corresponding to a current click position of the mouse; causing content displayed in the body display area of the document to jump to a text position of the entry of the directory corresponding to the current click position of the mouse; and changing a display color for and/or highlighting the entry of the directory corresponding to the current click position of the mouse. Also, a title of the document in the body of the document corresponding to the entry of the directory corresponding to the click position of the mouse may be further obtained, and the title of the document may be highlighted.

For example, when it is monitored that a mouse clicks on an entry 124' "Correct understanding of time management" of the directory, the entry 124' of the directory is displayed prominently, 122' is no longer displayed prominently, and the body display area of the document jumps to a corresponding position of the title. Due to the limited resolution of the grayscale image, the distinction in the drawing may not be readily observed. In FIG. 6, the title 124' is displayed in dark blue.

The title "Correct understanding of time management" in the body may be highlighted to facilitate reading and recognition of the user. After the user's attention is focused on the highlight, generally speaking, an emphasis is no longer needed after the position is confirmed. Therefore, in some embodiments, the highlight display may be cancelled after a certain period of time, such as a few seconds.

Figure 7A:
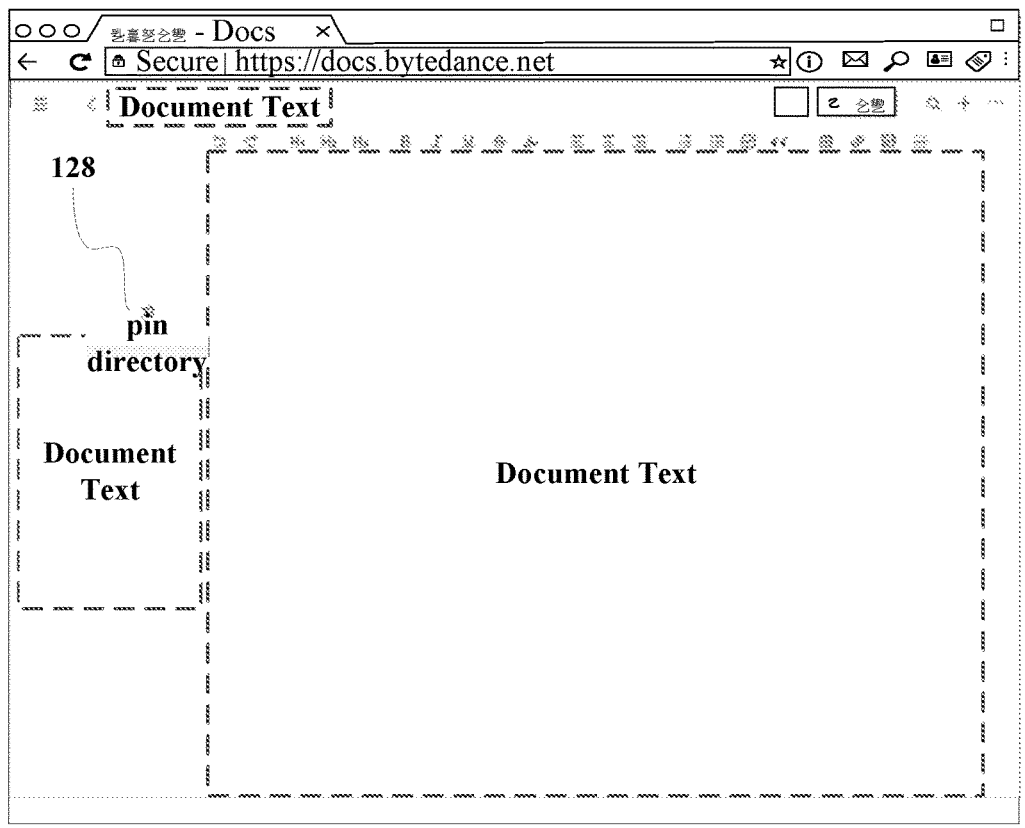
FIGS. 7A-7C are schematic diagrams showing a fifth scenario in which a directory of a document is displayed according to embodiments of the present disclosure.
Figure 7B:
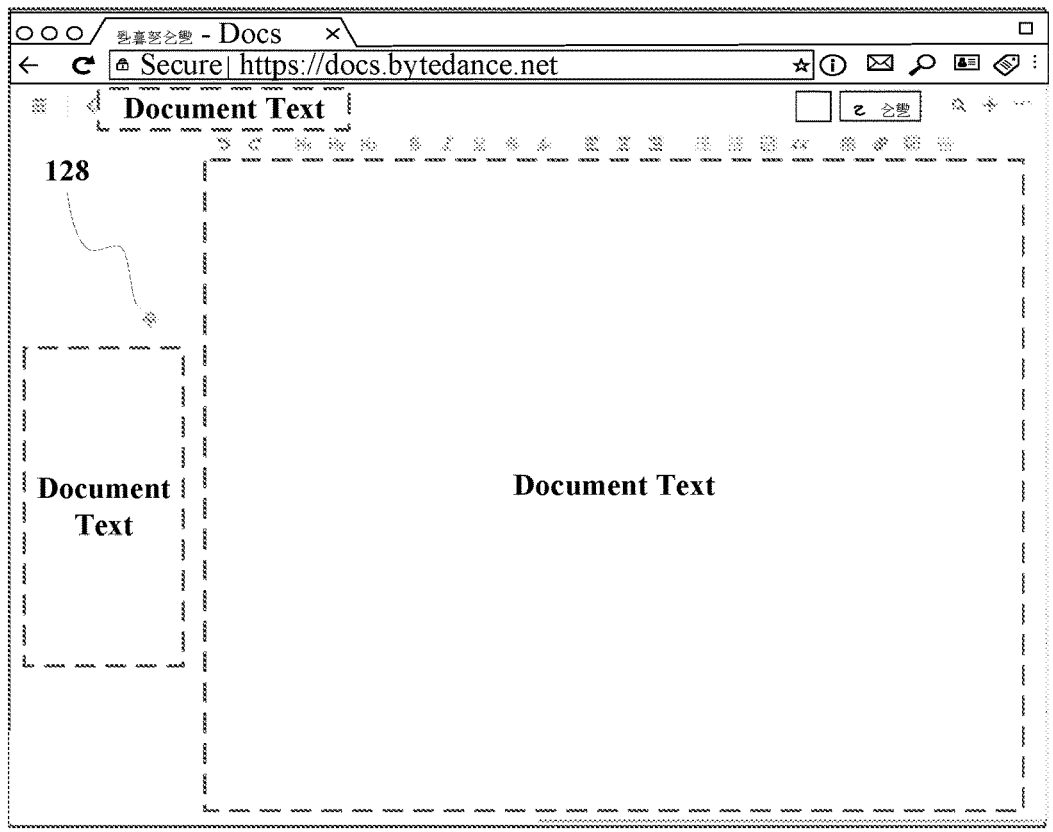
Figure 7C:
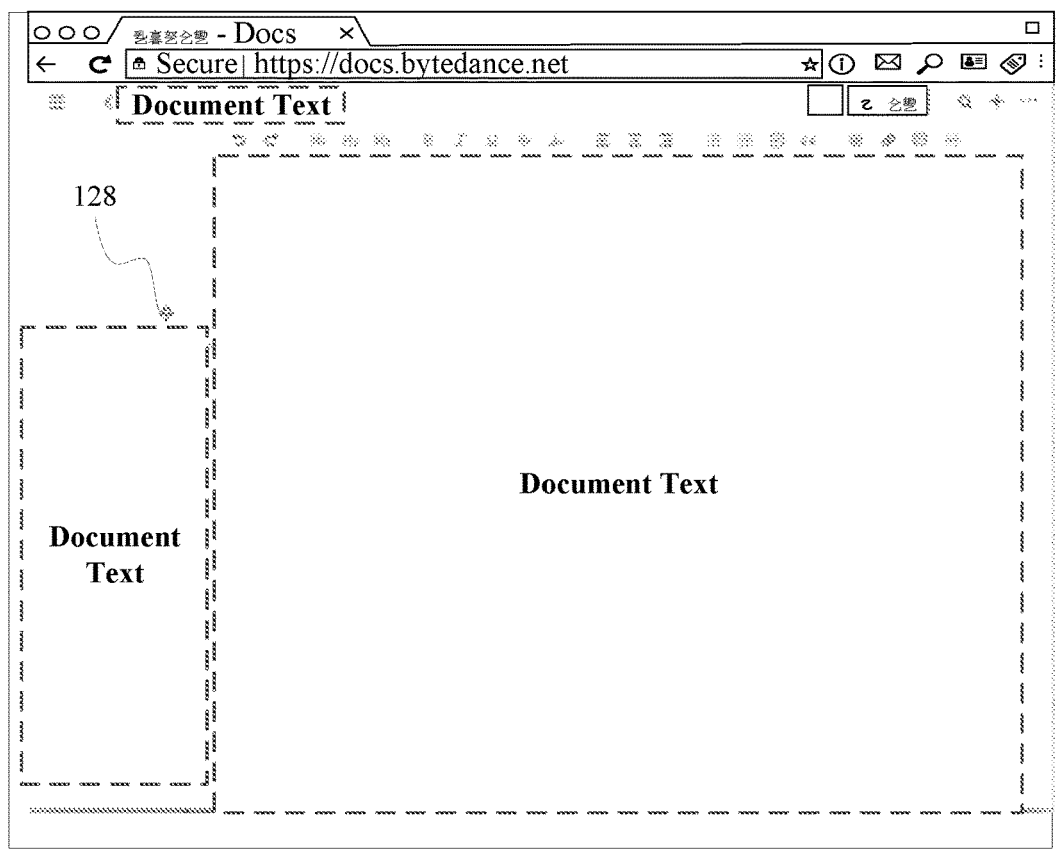

FIGS. 7A-7C are schematic diagrams of a scenario in which a directory of a document is displayed according to embodiments of the present disclosure. In the embodiments, displaying the entries of the directory in the form of thumbnail symbols, in the directory display area based on the directory hierarchy further includes displaying a first button icon 128 in the directory display area when a mouse cursor is within the directory display area. The first button icon 128 is configured to switch, upon being clicked by the mouse, a display form of the entries of the directory between performing a constant display and revoking the constant display. The constant display refers to a display form in which the entries of the directory are constantly presented as texts.

Consequently, a more flexible display form of the directory may be provided for the user.

For example, referring to FIG. 7A, when it is detected that the mouse cursor has moved to the directory display area, the directory is displayed in the form of texts, and a text prompt "pin directory" may be provided near the first button icon 128. If it is further detected that the user has clicked the first button icon 128, the entries of the directory are constantly displayed, and will not be changed to line segments even if the user is moving the mouse cursor out of the directory display area. In FIG. 7B, the text prompt is no longer displayed, and the directory is in a "pinned" stated. When the user no longer needs the constant display, the user may click the first button icon 128 again. After it is detected that the mouse has clicked the first button icon 128, the display form of the directory is switched from the original constant display to a non-constant display. The directory area is restored to that as illustrated in FIG. 7C, in which the text prompt is displayed. This means that the current directory is not "pinned". Then, when the mouse cursor moves out of the directory display area, the directory will be restored from the form of texts to the form of thumbnail symbols in line segments.

For a relatively long document, a large number of titles may exist, and may not be completely displayed on the side position of a page. Therefore, in some embodiments, only a certain number of entries may be set to be displayed when the directory is displayed. In other words, the displaying the entries of the directory in the form of thumbnail symbols in the directory display area based on the directory hierarchy further includes: determining whether a number of the entries of the directory is greater than a predefined number; and displaying, in response to the number of the entries of the directory being greater than the predefined number, the predefined number of entries among the entries of the directory, and hiding remaining entries. The number of displayed entries of the directory may be set based on page designs and reading habits. For example, ten entries, twelve entries, etc., may be set to be displayed.

Figure 8:
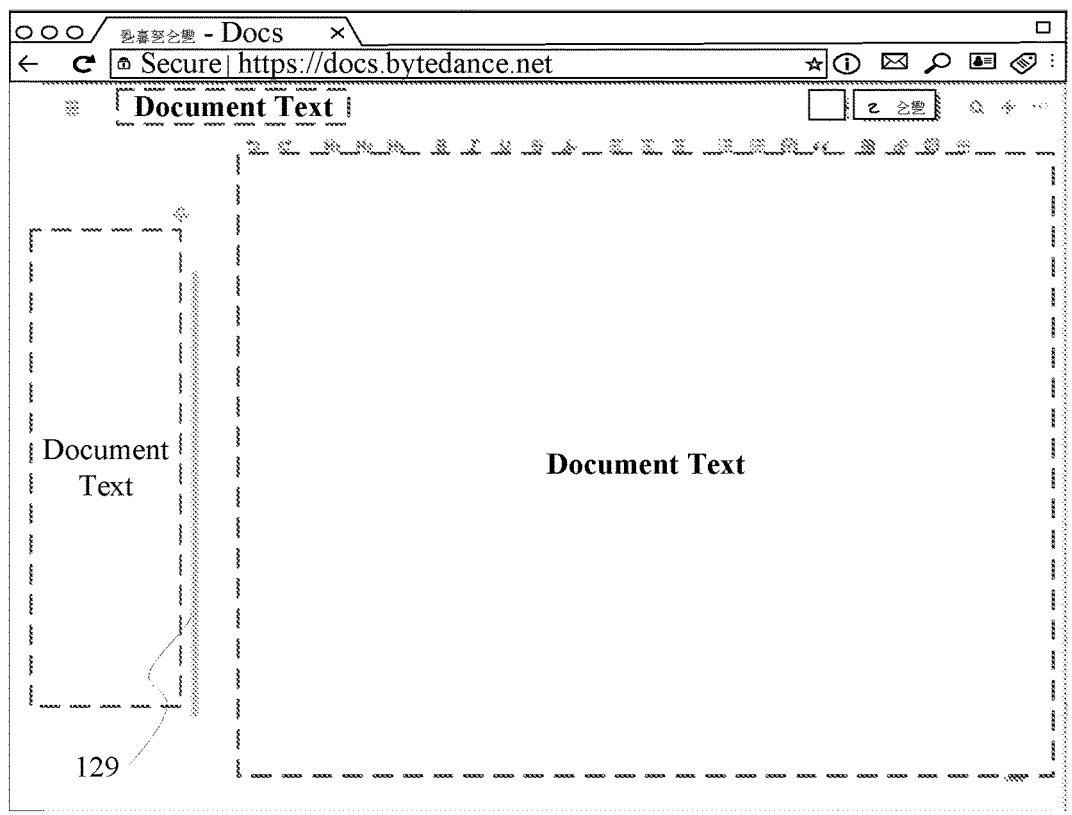
FIG. 8 is a schematic diagram showing a sixth scenario in which a directory of a document is displayed according to embodiments of the present disclosure.

In a case where a large number of entries of the directory exist and cannot be displayed in one page, a scroll bar for the directory may be provided to assist users in browsing and selecting an entry of the directory. FIG. 8 is a schematic diagram showing a sixth scenario in which a directory of a document is displayed according to embodiments of the present disclosure. A directory scroll bar 129 is provided in the directory display area. The directory scroll bar 129 is configured to control a display range of the entries of the directory. When the directory scroll bar 129 is being dragged, the entries of the directory within different ranges may be displayed accordingly.

The method for automatically displaying the directory of the document according to the present disclosure may generate the directory automatically based on the document structure without manual maintenance. Moreover, the directory structure of the document is displayed in the form of thumbnail icons at a side position in the document display area, thereby leading to the simple and clear directory without occupying too much display space. In addition, users may be provided with a variety of directory display solutions by displaying the text of the directory when the mouse cursor is hovering over the directory display area, displaying thumbnail symbols when the mouse cursor has left the directory display area, and showing the constant display when necessary, thereby resulting in the more flexible functions for the directory.

In order to implement the above method according to embodiments of a first aspect, embodiments of a second aspect of the present disclosure provide an apparatus for automatically displaying a directory of a document.

Figure 9:
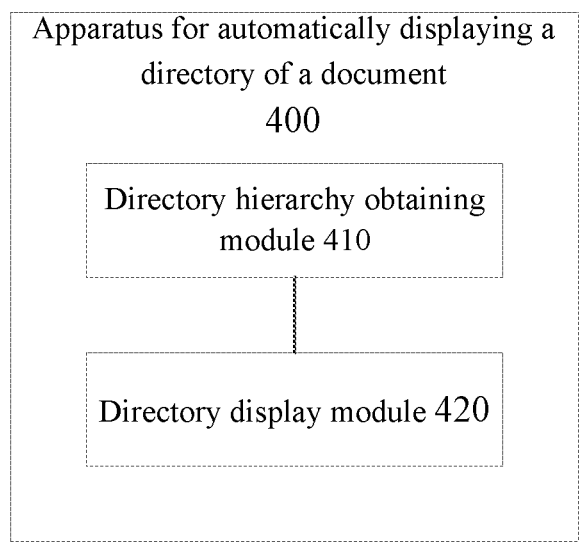
FIG. 9 is a block diagram of an apparatus for automatically displaying a directory of a document according to embodiments of the present disclosure.

FIG. 9 is a block diagram of an apparatus for automatically displaying a directory of a document according to embodiments of the present disclosure. The apparatus 400 according to the present disclosure may include a directory hierarchy obtaining module 410 and a directory display module 420.

The directory hierarchy obtaining module 410 is configured to obtain a directory hierarchy of a document.

The directory hierarchy obtaining module 410 obtaining the directory hierarchy of the document may include: obtaining title information and title level information in the document; and obtaining the directory hierarchy of the document based on the title information and the title level information.

The directory display module 420 is configured to, display, based on the directory hierarchy, the entries of the directory in a form of thumbnail symbols in a directory display area. The directory display area is an area disposed at a side position in a document display area for displaying the directory.

Figure 10:
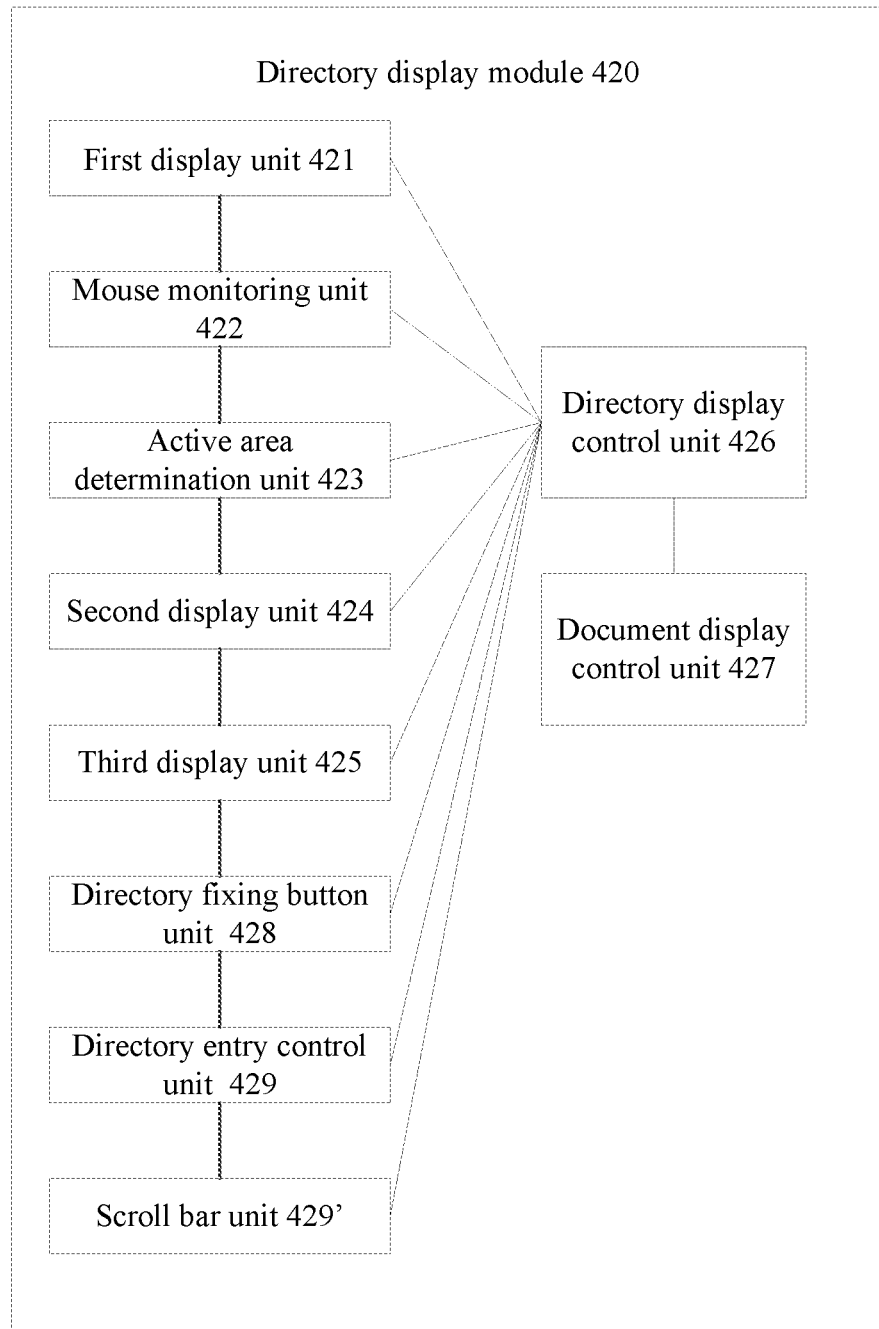
FIG. 10 is a block diagram of a directory display module according to embodiments of the present disclosure.

Referring to FIG. 10, in some embodiments, the directory display module 420 may further include a first display unit 421, a mouse monitoring unit 422, an active area determination unit 423, a second display unit 424, a third display unit 425, and a directory display control unit 426.

The first display unit 421 is configured to display, by using a line segment as the thumbnail symbol, a line segment symbol corresponding to each of the entries of the directory. The entries of the directory of different levels are displayed in line segments of different lengths.

In some embodiments, an entry of a higher level of the directory corresponds to a longer line segment, and entries of a same level of the directory correspond to line segments of the same length.

The mouse monitoring unit 422 is configured to obtain a position of a mouse cursor in a display window of the document and to monitor an operation of a mouse. For example, clicks, hovering, and wheel operations of the mouse may be monitored.

The active area determination unit 423 is configured to determine an active area of the displayed document, and to obtain a target entry of the directory corresponding to the active area.

Determining the active area of the displayed document by the active area determination unit may include: obtaining a position of a scroll bar in the document, and determining information of the active area based on the position of the scroll bar; and/or obtaining position information of an input cursor in the document, and determining the information of the active area based on a position of the input cursor; and/or obtaining position information of a mouse cursor in a display window of the document, and determining, when the mouse cursor is within the body display area of the document, an area of the document where the mouse cursor is located as the active area.

The second display unit 424 is configured to display the entries of the directory in a form of texts.

The third display unit 425 is configured to prominently display a thumbnail symbol or texts representing the target entry of the directory.

The prominently displaying may include: highlighting the thumbnail symbol representing the target entry of the directory corresponding to the active area; and/or changing a display color for the thumbnail symbol representing the target entry of the directory corresponding to the active area.

The directory display control unit 426 is configured to control the first display unit, the second display unit, and the third display unit to display the entries of the directory based on results outputted by the mouse monitoring unit and the active area determination unit.

The directory display control unit, which controls the first display unit, the second display unit, and the third display unit to display the entries of the directory based on the results outputted by the mouse monitoring unit and the active area determination unit, may perform different operations in different situations.

In some embodiments, the directory display control unit 426 may obtain the target entry of the directory corresponding to the active area outputted by the active area determination unit 423; and control the third display unit 425 to prominently display the thumbnail symbol representing the target entry of the directory.

In some embodiments, the directory display control unit 426 controlling the first display unit 421, the second display unit 424, and the third display unit 425 to display the entries of the directory based on the results outputted by the mouse monitoring unit 422 and the active area determination unit 423 further includes: obtaining the position information of the mouse cursor in the display window of the document outputted by the mouse monitoring unit 422; and controlling, when the mouse cursor is within the directory display area, the second display unit to display the entries of the directory in the form of texts.

In some embodiments, the directory display control unit 426 controlling the first display unit 421, the second display unit 424, and the third display unit 425 to display the entries of the directory based on the results outputted by the mouse monitoring unit 422 and the active area determination unit 423 further includes: obtaining an operation of a mouse within the directory display area outputted by the mouse monitoring unit 422; obtaining, when a hovering operation of the mouse is monitored, an entry of the directory corresponding to a hovering position of the mouse cursor, and controlling the third display unit 425 to display prominently the entry of the directory corresponding to the hovering position of the mouse cursor; and controlling, when an operation indicating that the mouse cursor has left the hovering position is monitored, the third display unit 425 to revoke the displaying prominently of the entry of the directory corresponding to the hovering position.

In some embodiments, the directory display module 420 may further include a document display control unit 427. The document display control unit 427 is configured to control display content of a body display area of the document. The directory display control unit 426 is further configured to: obtain the mouse operation within the directory display area outputted by the mouse monitoring unit 422; when a click operation of the mouse is monitored, obtain an entry of the directory corresponding to a current click position of the mouse; control the document display control unit 427 to cause content displayed in a body display area of the document to jump to a text position of the entry of the directory corresponding to the current click position of the mouse; and control the third display unit 435 to change a display color for the entry of the directory corresponding to the current click position of the mouse, and/or to highlight the entry of the directory corresponding to the current click position of the mouse.

In some embodiments, the directory display module 420 may further include a directory fixing button unit 428. The directory fixing button unit 428 is configured to display a first button icon in the directory display area when a mouse cursor is within the directory display area; and to switch, when the first button icon is detected to be clicked by the mouse cursor, a display form of the entries of the directory between performing a constant display and revoking the constant display. The constant display is a display form in which the entries of the directory are constantly presented as texts.

In some embodiments, the directory display module 420 may further include a directory entry control unit 429. The directory entry control unit 429 is configured to determine whether a number of the entries of the directory is greater than a predefined number; and to display, in response to the number of the entries of the directory being greater than the predefined number, the predefined number of entries among the entries of the directory, and hiding remaining entries.

In some embodiments, the directory display module 420 may further include a scroll bar unit 429'. The scroll bar unit 429' is configured to provide a directory scroll bar in the directory display area. The directory scroll bar is configured to control a display range of the entries of the directory.

For specific details of implementations of functions and roles of each module in the apparatus for automatically displaying the directory of the document according to the present disclosure, reference may be made to the implementations of corresponding steps in the above method. Since apparatus embodiments basically correspond to method embodiments, the foregoing explanation of the method embodiments of the present disclosure is also applicable to the apparatus embodiments of the present disclosure. To avoid redundancy, not all details will be repeated in the apparatus embodiments. For related parts that are not described in detail, reference may be made to relevant descriptions of the embodiments of the method for automatically displaying the directory of the document according to the present disclosure made in combination with FIGS. 1 to 8.

The apparatus for automatically displaying the directory of the document according to the present disclosure may generate the directory automatically based on the document structure without manual maintenance. The directory structure of the document is displayed at a side position in the document display area in the form of thumbnail icons, thereby leading to the simple and clear directory without occupying too much display space. In addition, users may be provided with a variety of directory display solutions by displaying the text of the directory when the mouse cursor is hovering over the directory display area, displaying thumbnail symbols when the mouse cursor has left the directory display area, and showing the constant display when necessary, thereby resulting in the more flexible functions for the directory.

Embodiments of a third aspect of the present disclosure provide a non-transitory computer-readable storage medium having an executable instruction stored thereon. When the executable instruction is executed on a processor, the method for automatically displaying the directory of the document according to the embodiments of the first aspect of the present disclosure may be implemented. The storage medium may be set on a device as a part of the device; or when the device may be remotely controlled by a server, the storage medium may be set on a remote server that controls the device. A non-transitory computer-readable medium may include any computer-readable medium, except for a temporary signal in transmission.

Embodiments of a fourth aspect of the present disclosure provide a computer program product. When instructions in the computer program product are executed by the processor, the method for automatically displaying the directory of the document according to embodiments of the first aspect of the present disclosure is implemented.

A computer program code for performing operations of the present disclosure may be written in one or more programming languages or a combination thereof. The programming language includes an object-oriented programming language, such as Java, Smalltalk, C++, as well as a conventional procedural programming language, such as "C" language or a similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer through any kind of network, including a local area network (LAN) or a wide area network (WAN), or may be connected to an external computer (for example, an Internet service provider may be used to establish Internet connection).

Embodiments of a fifth aspect of the present disclosure provide a computer device including a memory, a processor, and a computer program stored on the memory and running on the processor. When the processor executes the program, the method for automatically displaying the directory of the document according to the first aspect of the present disclosure may be implemented.

Figure 11:
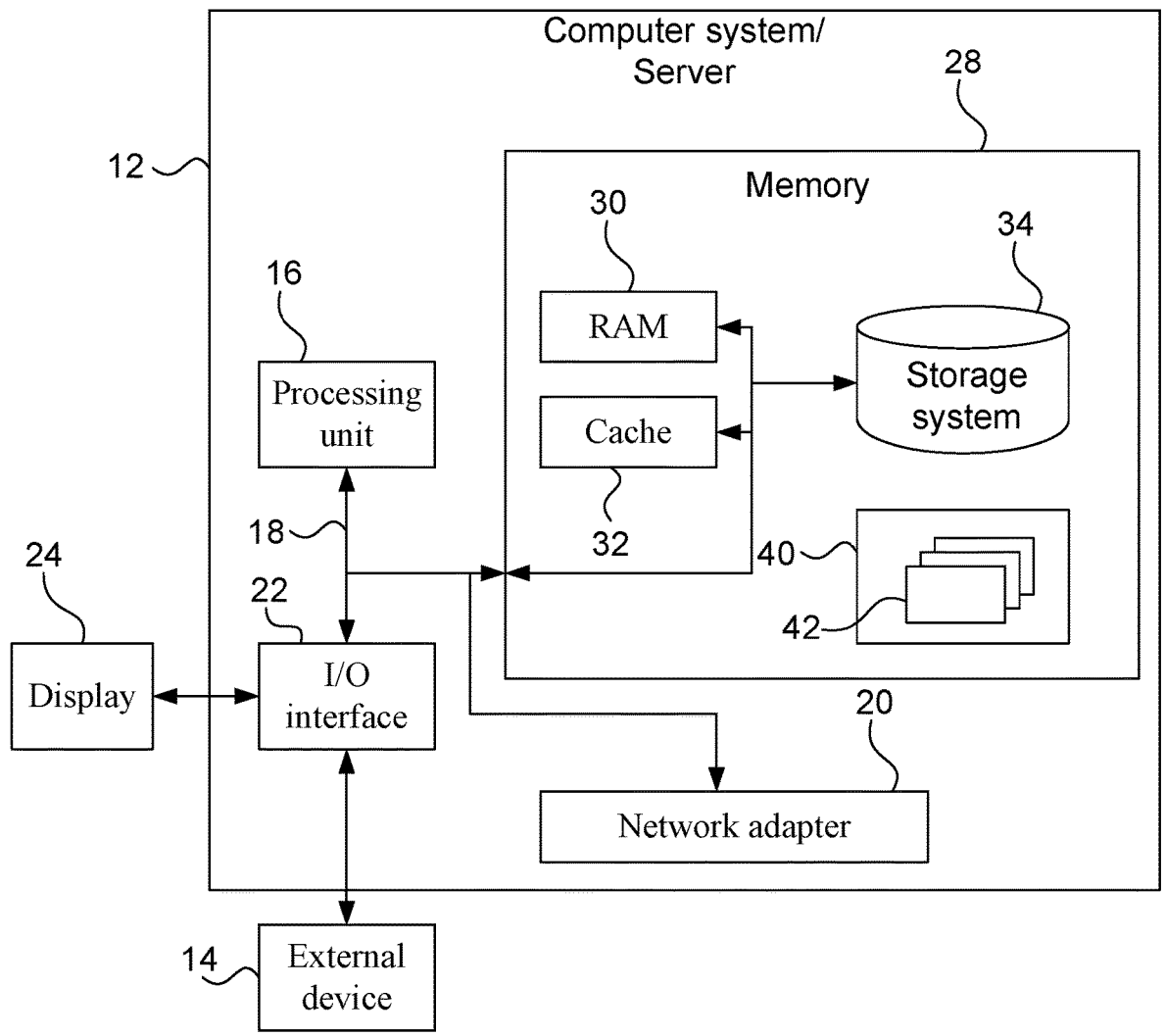
FIG. 11 is a schematic diagram showing a structure of a computer device according to embodiments of the present disclosure.

FIG. 11 is a schematic diagram showing a structure of an exemplary computing device suitable for implementing embodiments of the present disclosure. The computing device 12 illustrated in FIG. 11 is only an example, and should not bring any limitation to functions and the scope of use of embodiments of the present disclosure.

As illustrated in FIG. 11, a computing device 12 may be implemented in a form of a general-purpose computing device. Components of the computing device 12 may include, but are not limited to one or more processors or processing units 16, a system memory 28, and a bus 18 connecting different system components (including the system memory 28 and the processing unit 16).

The bus 18 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the computing device 12 may include various computer-readable media, which may be any storage media accessible by the computing device 12, including transitory or non-transitory storage medium and movable or unmovable storage medium.

The memory 28 may include a computer-readable medium in a form of volatile memory, such as a random access memory (hereinafter referred to as RAM) 30 and/or a cache memory 32. The computing device 12 may further include other movable/unmovable storage media and transitory/non-transitory storage media. In way of example only, a storage system 34 may be configured to read and write non-removable, non-volatile magnetic media (not shown in the figure, commonly referred to as "hard disk drives").

Although not illustrated in FIG. 11, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The computing device 12 may also communicate with one or more external devices 14 (e.g., a keyboard, a pointing device, a display 24, and etc.) and may also communicate with one or more devices that enables a user to interact with the computer system/server 12, and/or any device (e.g., a network card, a modem, and etc.) that enables the computing system/server 12 to communicate with one or more other computing devices. Such communication may be performed through an input/output (I/O) interface 22. In addition, the computing device 12 may be connected to and communicate with one or more networks such as a local area network (LAN), a wide area network (WAN) and/or a public network such as the Internet through a network adapter 20. As illustrated in FIG. 11, the network adapter 20 communicates with other modules of the computing device 12 through the bus 18. It should be understood that although not illustrated in the figure, other hardware and/or software modules may be used in combination with the computing device 12, which including, but not limited to, microcode, device drivers, redundant processing units, external disk drive arrays, RAID systems, tape drives, as well as data backup storage systems and the like.

The processing unit 16 executes, by running a program stored in the system memory 28, various functional applications and data processing to, for example, implement the method mentioned in the foregoing embodiments.

The non-transitory computer-readable storage medium, the computer program product, and the computer device according to the third to fifth aspects of the present disclosure may be implemented with reference to the content specifically described in the embodiments of the first aspect of the present disclosure, and have similar beneficial effects to the method for automatically displaying the directory of the document as described in the first aspect of the present disclosure. Repeated description will be omitted here.

It should be noted that in the description of the specification, any procedure or method described in the flow charts or described in any other way herein may be understood to include one or more modules, portions or parts for storing executable codes that realize particular logic functions or procedures. Moreover, advantageous embodiments of the present disclosure include other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

In addition, terms such as "first" and "second" are used herein for purposes of description and are not intended to indicate or imply relative importance or significance. Thus, the feature defined with "first" and "second" may include one or more this feature. In the description of the present disclosure, "a plurality of" means at least two, for example, two or three, unless specified otherwise.

Although explanatory embodiments have been illustrated and described, it would be appreciated by those skilled in the art that the above embodiments cannot be construed to limit the present disclosure, and changes, alternatives, and modifications may be made in the embodiments by those skilled in the art without departing from scope of the present disclosure.

What is claimed is:

1. A method for automatically displaying a directory of a document, comprising:
    obtaining a directory hierarchy of the document, the directory hierarchy comprising entries of the directory and levels of the entries; and
    displaying, based on the directory hierarchy, the entries of the directory in a form of thumbnail symbols in a directory display area, the directory display area being an area disposed at a side position in a document display area for displaying the directory,
    wherein said displaying, based on the directory hierarchy, the entries of the directory in the form of thumbnail symbols in the directory display area comprises:
    displaying a first button icon in the directory display area when a mouse cursor is within the directory display area, wherein the first button icon is configured to switch, upon being clicked by the mouse cursor, a display form of the entries of the directory between performing a constant display and revoking the constant display, and the constant display is a display form in which the entries of the directory are constantly presented in a form of texts, and
    wherein when the constant display is revoked, the display form is switched from the constant display to a non-constant display, in which when the mouse cursor moves out of the directory display area, the directory will be restored from the form of texts to the form of thumbnail symbols.

2. The method of claim 1, wherein said obtaining the directory hierarchy of the document comprises:
    obtaining title information and title level information in the document; and
    obtaining the directory hierarchy of the document based on the title information and the title level information.

3. The method of claim 1, wherein said displaying, based on the directory hierarchy, the entries of the directory in the form of thumbnail symbols in the directory display area comprises:
    displaying a line segment symbol corresponding to each of the entries of the directory by using the line segment as a thumbnail symbol, wherein the entries of the directory of different levels are displayed in line segments of different lengths.

4. The method of claim 1, wherein said displaying, based on the directory hierarchy, the entries of the directory in the form of thumbnail symbols in the directory display area comprises:
    obtaining information on an active area in the document, the active area being a currently operated area in a body display area of the document;

obtaining a target entry of the directory corresponding to the active area; and displaying prominently a thumbnail symbol representing the target entry of the directory corresponding to the active area.

5. The method of claim 4, wherein said displaying prominently the thumbnail symbol representing the target entry of the directory corresponding to the active area comprises:

highlighting the thumbnail symbol representing the target entry of the directory corresponding to the active area; and/or changing a display color for the thumbnail symbol representing the target entry of the directory corresponding to the active area.

6. The method of claim 1, wherein said displaying, based on the directory hierarchy, the entries of the directory in the form of thumbnail symbols in the directory display area comprises:

monitoring an operation of a mouse within the directory display area;

obtaining, when a hovering operation of the mouse is monitored, an entry of the directory corresponding to a hovering position of a mouse cursor, and displaying prominently the entry of the directory corresponding to the hovering position of the mouse cursor; and revoking, when an operation indicating that the mouse cursor has left the hovering position is monitored, the displaying prominently of the entry of the directory corresponding to the hovering position.

7. The method of claim 1, wherein said displaying, based on the directory hierarchy, the entries of the directory in the form of thumbnail symbols in the directory display area comprises:

monitoring an operation of a mouse within the directory display area; and when a click operation of the mouse is monitored:

obtaining an entry of the directory corresponding to a current click position of the mouse;

causing content displayed in a body display area of the document to jump to a text position of the entry of the directory corresponding to the current click position of the mouse; and changing a display color for the entry of the directory corresponding to the current click position of the mouse, and/or highlighting the entry of the directory corresponding to the current click position of the mouse.

8. The method of claim 1, wherein said displaying, based on the directory hierarchy, the entries of the directory in the form of thumbnail symbols in the directory display area comprises:

determining whether a number of the entries of the directory is greater than a predefined number;

displaying, in response to the number of the entries of the directory being greater than the predefined number, the predefined number of entries among the entries of the directory, and hiding remaining entries; and providing a directory scroll bar in the directory display area, the directory scroll bar being configured to control a display range of the entries of the directory.

9. The method of claim 1, wherein said displaying, based on the directory hierarchy, the entries of the directory in the form of thumbnail symbols in the directory display area comprises:

obtaining position information of a mouse cursor in a display window of the document; and changing, when the mouse cursor is within the directory display area, the entries of the directory from being displayed in the form of thumbnail symbols to being displayed in a form of texts.

10. A non-transitory computer-readable storage medium having a computer program stored thereon, wherein the computer program, when executed by a processor, causes the method of claim 1 to be implemented.

11. An electronic device, comprising: a memory, a processor, and a computer program stored in the memory and executable on the processor, wherein the processor, when executing the program, implements the method of claim 1.

* * * * *